Figure 3:
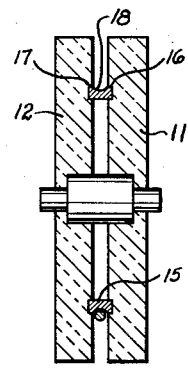

June 29, 1965  C. B. HEARD, JR  3,191,437
DEVICE FOR MEASURING THE TEMPERATURE OF A CONTINUOUSLY
ADVANCING STRAND
Filed Nov. 26, 1962

INVENTOR.
C. B. HEARD JR.
BY *S. Gundersen*
ATTORNEY

United States Patent Office 3,191,437
Patented June 29, 1965

3,191,437
DEVICE FOR MEASURING THE TEMPERATURE
OF A CONTINUOUSLY ADVANCING STRAND
Charles B. Heard, Jr., Greenbelt, Md., assignor to Western
Electric Company, Incorporated, New York, N.Y., a
corporation of New York
Filed Nov. 26, 1962, Ser. No. 239,952
5 Claims. (Cl. 73—339)

This invention relates to an apparatus for measuring the temperature of a strand and particularly to an apparatus for measuring the temperature of a continuously advancing strand.

In extruding an insulating sheath, for example polyvinyl chloride, on a conductor, it is necessary to measure the temperature of the wire in order to properly insulate the wire. If the wire is not the proper temperature, a nonuniform and a poorly bonded insulating sheath will result. Therefore, it is essential that an accurate measurement of the temperature of the conductor or wire be made prior to insulating the conductor. Where the conductor is a very fine wire, for example 26 to 19-gage wire having a diameter from 0.018 to 0.036 inch, it is extremely difficult to obtain an accurate temperature measurement under normal operating conditions due to the small diameter of the wire. It is highly desirable to use a rolling contact to measure the temperature of the wire so as to avoid error due to frictional heating and in order to avoid wear on the fine-wire conductor. Where a rolling contact is used, the surface of the temperature measuring device is rapidly cooled due to the spinning effect of the roller. This is particularly critical in measuring the temperature of a conductor, as the roller spins at a high rate of speed due to the conductor advancing at upwards of 2,000 feet per minute. The temperature measuring devices of the prior art use an exposed heat-conductive surface or a thermocouple which is rolled across a surface to ascertain its temperature. However, due to the small diameter of a wire, heat loss by radiation and convection from the exposed heat-conductive surface or thermocouple is too great as compared to the heat gain from the wire to provide an accurate measurement of the temperature of the wire. Therefore, in the prior art where the temperature of a small diameter wire advancing at a high rate of speed is measured, difficulty is encountered in obtaining an accurate measurement of the temperature of the wire. It has been found impractical to provide the roller with a thermocouple, as the current loss from a brush arrangement taking the current from the roller is too great as compared to the current produced by the difference in temperature between the wire and the thermocouple.

It is, therefore, an object of this invention to provide a device for accurately measuring the temperature of a continuously advancing strand.

Another object of the invention is to provide facilities for insulating a temperature responsive surface so as to accurately measure the temperature of a strand continuously advancing at a high rate of speed.

With these and other objects in view, the present invention contemplates a heat-insulating wheel which retains an interior heat conductive ring, the wheel having an annular slot which permits the inserting of a wire into the wheel so as to contact the ring and heat the ring to the temperature of the wire without excessive heat loss due to rotation of the wheel, radiation or convection.

Figure 1:
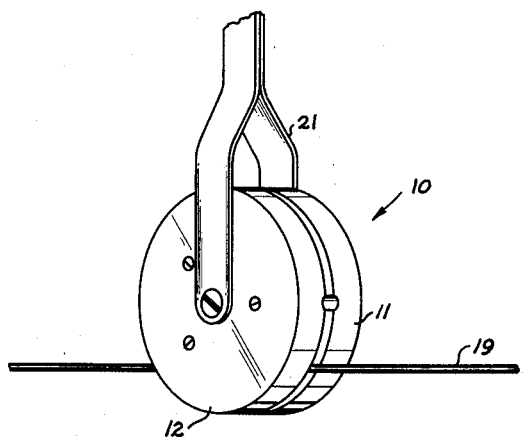
Figure 4:
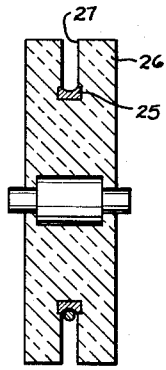
Figure 2:
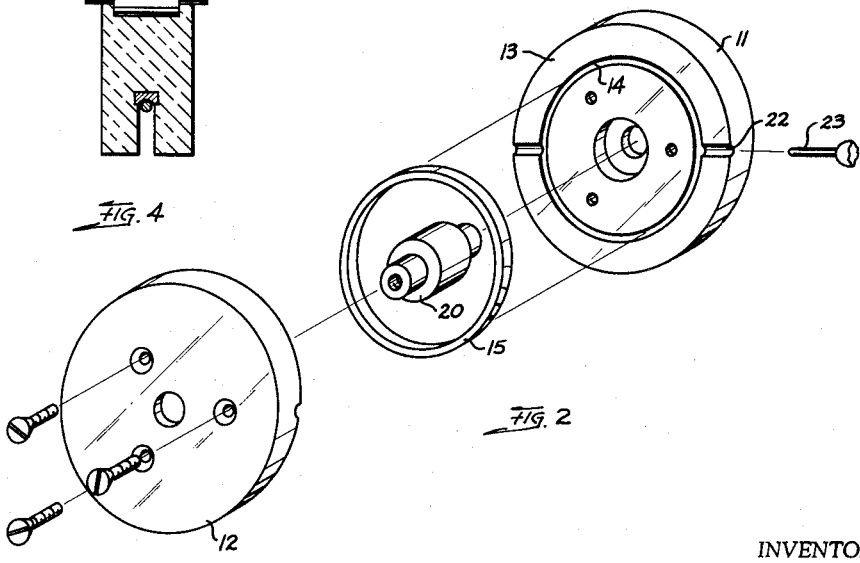

Other objects and advantages of the present invention will be apparent from the following detailed description when considered in conjunction with the accompanying drawings, wherein:

FIG. 1 is a perspective view of a wheel embodying the principal features of the present invention, FIG. 2 is an exploded view of the wheel of FIG. 1, FIG. 3 is a cross sectional view of the wheel of FIG. 1, FIG. 4 is a sectional view showing a different embodiment of the invention.

Referring now in detail to the drawings and particularly to FIG. 1, a temperature measuring wheel is generally indicated by the numeral 10. Disks 11 and 12 are made from an insulating material, such as fiberglass or asbestos board, and may be attached one to the other by screws, bonding, etc.

As seen in FIG. 2, the disk 11 is provided with an annular interior flange 13. The flange 13 forms a shoulder 14 which retains a ring or sleeve 15. The ring 15 may be composed of any suitable heat conducting material, as for example, copper. The disk 12 has an annular interior flange which is identical to flange 13. As will be noted in FIG. 3, the spacer or ring 15 has shoulders 16 and 17. The shoulders 16 and 17 are of the same width as the flanges on the disks 11 and 12, whereby the ring 15 is retained within the disks 11 and 12. Any suitable groove or boss may be provided on the interior surfaces of the disks 11 and 12 for retaining the ring therebetween. The ring 15 has an annular groove 18 which accommodates wire 19. Therefore, the disks 11 and 12 will be spaced apart by the ring 15, a distance equal to at least the diameter of the wire or strand 19. A race bearing 20 is also retained within the disks 11 and 12 so as to permit free rotation of the wheel 10. A handle 21 is provided to support the wheel 10 over the wire 19.

The distance between the ring 15 and the rim of the wheel 10 should be several times the diameter of the wire. In this manner, the rapid rotation of the wheel, i.e., spinning, will not appreciably affect the temperature of the ring 15. Further, due to the insulating properties of the disks 11 and 12, no appreciable amount of heat will be lost from the ring 15 due to radiation or convection.

In FIG. 2 it will be noted that the flange 13 is provided with radial slots 22. The flange of disk 12 is provided with identical slots which mate with the slots 22 of flange 13. These slots form passageways which permit a probe 23 of a conventional surface temperature measuring device, such as a surface pyrometer, to be inserted between the disks 11 and 12 into contact with the ring 15 so as to record the temperature of the ring. Obviously, if the probe of the surface pyrometer has a diameter equal to or less than the diameter of the wire, there is no necessity to provide the slots 22.

FIG. 4 sets forth a different embodiment of the invention, wherein a heat conductive ring 25 is moulded into a heat insulating wheel 26. A heat resistive material, such as glass or a heat resistive plastic, is moulded about the ring 25 to form wheel 26. Another slot 27 is provided for the insertion of the wire into the wheel 26 so as to contact the ring 25. The wheel 26 would then be used to measure the temperature of the wire in the same manner as wheel 10. The wheel 26 may be mounted on any suitable shaft and supported in any suitable manner for free rotation when in contact with a wire.

In operation the wheel 10 is placed over the wire 19 so as to bring the ring 15 into contact with the wire. As the wire advances, the wheel 10 will rotate freely so as to keep frictional heat gains to a minimum. When the ring 15 has been in contact with the wire a sufficient length of time to bring the temperature of the ring up to the temperature of the wire, the wheel 10 is removed from the wire and the probbe 23 inserted to measure the temperature of the ring 15. As the copper ring 15 is relatively small and light, it will rapidly reach the temperature of the wire; however, due to the heavy insulating disks 11 and 12, heat loss from the ring 15 is negligible. Further, as the copper ring is recessed within the wheel 10, the ring 15 will not be cooled by the spinning or rotation of the wheel. Therefore, the ring 15 when placed on the wire will rapidly reach the temperature of the wire; and upon removal of the roller from the wire, this temperature will be maintained for a relatively long period of time, thereby permitting an accurate measurement of the temperature of the wire by a commercial temperature measuring device.

It is to be understood that the above-described arrangement of apparatus and construction of elemental parts are simply illustrative of an application of the principles of the invention and many other modifications may be made without departing from the invention.

What is claimed is:

1. In a device for sensing the temperature of a continuously advancing wire,
    a heat insulating wheel mounted for free rotation on a shaft and having a circumferential groove in the wheel extending inwardly toward the axis of rotation a distance substantially greater than the diameter of the wire, the width of the groove being slightly greater than the wire, and
    a heat conductive ring concentrically mounted in the wheel at the base of the groove so as to permit contact of the wire with the ring when the wire is inserted into the groove.

2. In a device for sensing the temperature of a continuously advancing wire,
    two insulating disks,
    a heat conductive ring having a diameter smaller than the diameter of the disks by an amount substantially greater than the diameter of the wire and a width at least as large as the diameter of the wire, and
    means for mounting the disks for free rotation on a shaft with the ring secured concentrically therebetween, the space between the disks extending outwardly from the ring providing a passageway for entry of the wire so as to permit contact of the wire with the ring.

3. In a device for sensing the temperature of a continuously advancing wire,
    two insulating disks, the disks having a common axis of rotation,
    means for mounting the disks for free rotation about their axis, and
    a heat conductive sleeve having a diameter smaller than the disks by an amount substantially greater than the diameter of the wire, concentrically mounted between the disks, said sleeve spacing the disks by a distance slightly greater than the diameter of the wire so as to permit contact of the wire with the sleeve upon insertion of the wire between the disks.

4. A device for measuring the temperature of a moving length of conductor, comprising:
    support means,
    a wheel mounted for free rotation on said support means, said wheel including a groove formed in the periphery of said wheel for receiving the conductor and being composed at least in part of a heat-insulating material,
    a heat conductive element mounted adjacent the bottom of said groove and adapted to make contact with the conductor when the conductor is inserted in said groove,
    said groove having a depth sufficient to inhibit the dissipation of heat between said element and the conductor during wheel rotation, and
    means for measuring the temperature of said element.

5. The device as claimed in claim 4, wherein:
    said heat-conductive element is formed so as to accommodate a substantial portion of the heat-radiating surface of the conductor during contact therewith.

References Cited by the Examiner
UNITED STATES PATENTS

| | | | |
|---|---|---|---|
| 2,723,105 | 11/55 | Franklin | 254—190 |
| 2,924,431 | 2/60 | Chadbourne | 254—192 |
| 2,947,171 | 4/60 | Peltola | 73—359 |

ISAAC LISANN, *Primary Examiner.*